United States Patent

Hyde et al.

[15] 3,684,237

[45] Aug. 15, 1972

[54] VARIABLE FORCE ANGLE LINKAGE

[72] Inventors: Gilbert F. Hyde, Brookhaven; Ralph W. LeGates, Glen Mills, both of Pa.

[73] Assignee: Westinghouse Electric Corporation, Pittsburgh, Pa.

[22] Filed: May 4, 1970

[21] Appl. No.: 34,464

[52] U.S. Cl. .................251/58, 251/232, 251/330, 74/110
[51] Int. Cl. ...................F16k 31/16, F16k 41/18
[58] Field of Search ............251/58, 232, 330; 74/110

[56] References Cited

UNITED STATES PATENTS

| 677,940 | 7/1901 | Carr | 251/58 X |
| 2,624,980 | 1/1953 | Hughes | 251/58 X |
| 2,358,186 | 9/1944 | Pond | 251/58 X |
| 363,643 | 5/1887 | Jacobs | 251/58 |

FOREIGN PATENTS OR APPLICATIONS

| 11,990 | 1885 | Great Britain | 74/110 |
| 556,782 | 2/1957 | Italy | 74/110 |

*Primary Examiner*—Arnold Rosenthal
*Attorney*—A. T. Stratton, F. P. Lyle and F. Cristiano, Jr.

[57] ABSTRACT

A variable force angle linkage, particularly adapted for use in actuating steam valves and the like, consisting of four linkages and characterized in that the force on a valve or other device is greatest when the valve is adjacent its seat, the force gradually diminishing as the valve moves away from its seat, whereby the actuator force does not overstress the backseat contact surface of the valve when in its fully open position. At the same time, the dimension of the actuator along the axis of the valve is greatly reduced over prior art actuators.

4 Claims, 5 Drawing Figures

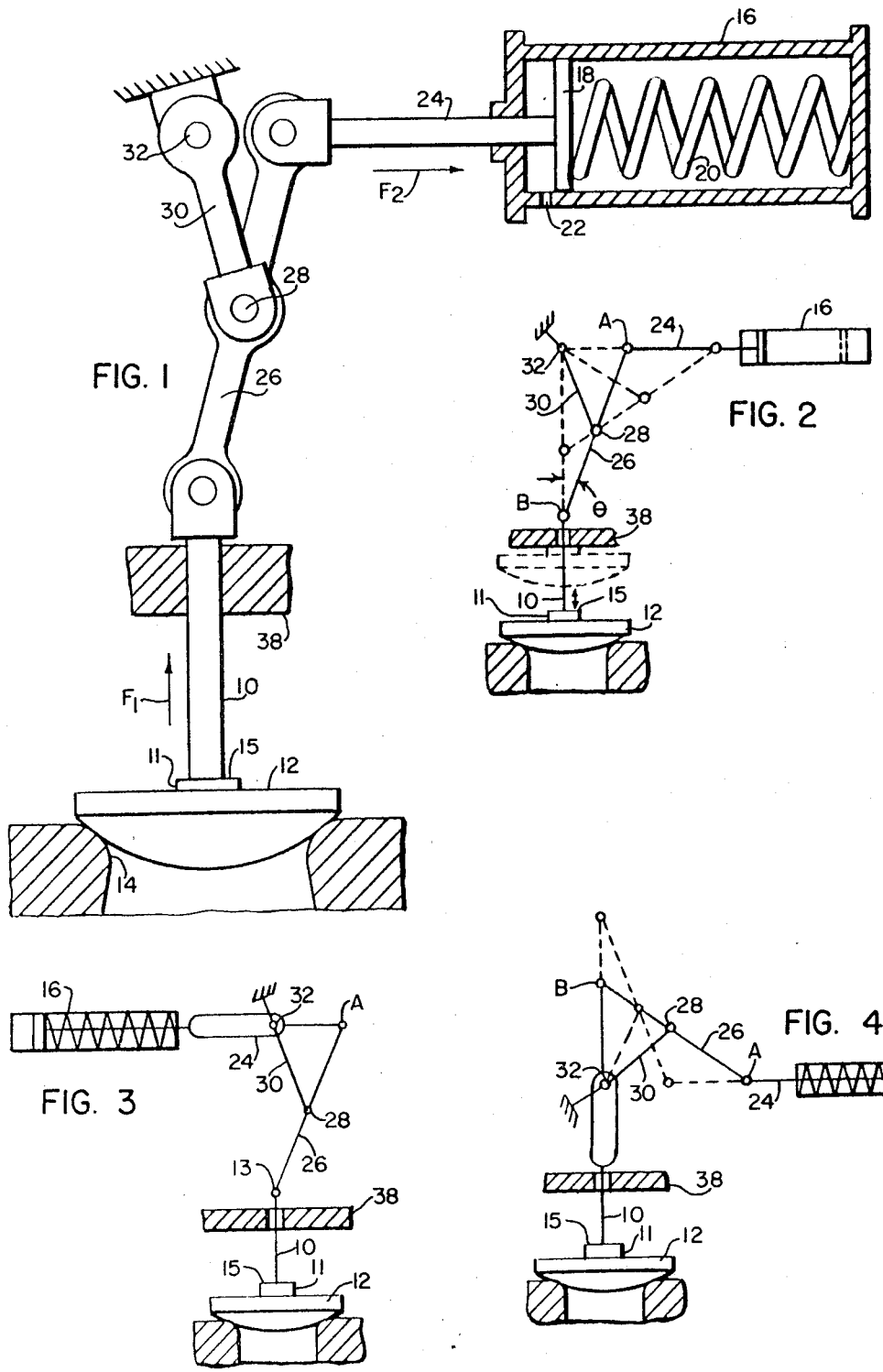

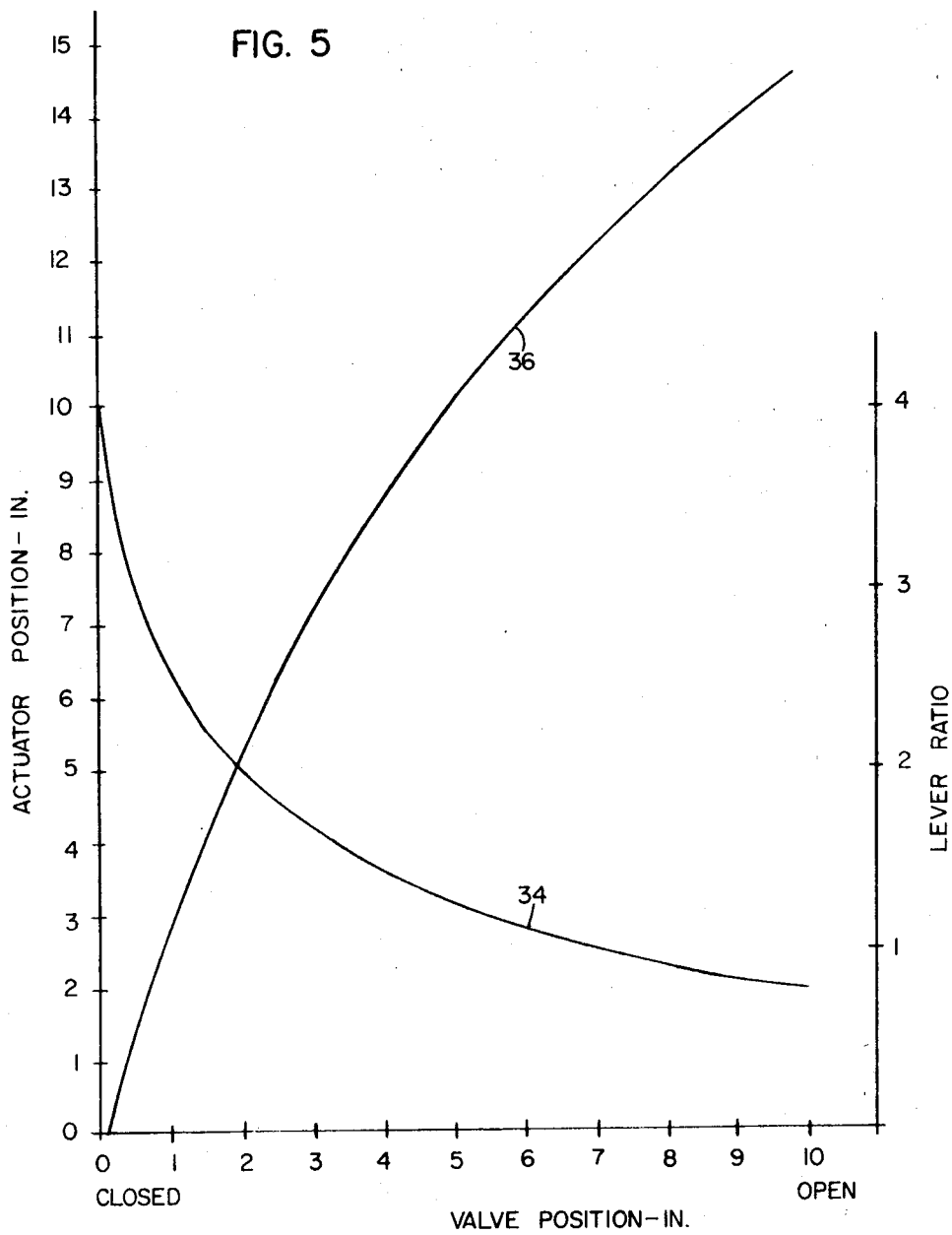

VARIABLE FORCE ANGLE LINKAGE

BACKGROUND OF THE INVENTION

In plug-type steam valves and the like, it is necessary to open a valve member against a large pressure differential while using as little axial space as possible (i.e., along the axis of the valve). In addition, the valve must close rapidly while its impact velocity on the seat is minimized. Stated in other words, the valve must move away from its associated seat under maximum force and return at a controlled, gradual rate. At the same time, the valve stem must "backseat" in the wide open position to reduce steam leakage along the stem; and this should be done under low force conditions to avoid overstressing the backseat contact surface.

In the past, constant force ratio lever designs have been used to actuate steam valves and the like. The steam valve was loaded in the closing direction by a spring and was opened by an actuator acting through a lever. In order to develop the required opening force on the valve, either a very large diameter actuator piston and a low linkage ratio, or nominal diameter actuator piston and a high linkage ratio, is required. Both arrangements have a large volume of oil to be displaced when closing and are, therefore, slow closing. The high linkage ratio design also increases the actuator travel and takes up space along the axis of the valve. Belleville washers or the like are usually provided to absorb the excess actuator force in the wide open position so as not to overstress the valve stem backseat. Thus, prior art valve actuators required either an excessively large actuator piston or an excessively large amount of space along the axis of the valve. Furthermore, being a constant force arrangement, provision had to be made to prevent damaging the backseat of the valve.

SUMMARY OF THE INVENTION

In accordance with the present invention, a linkage is provided for actuating a valve element or the like wherein the lever ratio (i.e., valve force divided by actuator force) is initially high as the valve is unseated from its seat and thereafter decreases as the valve moves toward its backseated position. Conversely, as the valve moves from its backseated to its seated position, the force gradually increases while its rate of travel decreases. At the same time, the axial length of the linkage is decreased over prior art actuating linkages.

The foregoing is accomplished by means including an actuator for reciprocating a first linkage along a straight-line path of travel, and a second linkage reciprocable along a straight-line path of travel in essentially the same plane as the first linkage at right angles thereto. A third linkage is pivotally connected to the ends of the first and second linkages; while a fourth linkage is pivotally connected at its one end to the third linkage at its centerpoint and pivotally connected at its other end to a fixed point defined by the intersection of the sides of a right triangle whose hypotenuse constitutes the third linkage.

The above features of the invention will become apparent from the following detailed description taken in connection with the accompanying drawings which form a part of this specification, and in which:

BRIEF DESCRIPTION OF THE DRAWINGS

FIG. 1 is a plan view of the variable force linkage mechanism of the invention showing the manner in which it can be connected to a steam valve and actuator, the latter being shown in cross-section;

FIG. 2 is a schematic diagram illustrating the operation of the variable force linkage mechanism of FIG. 1;

FIG. 3 is a schematic diagram of another embodiment of the invention;

FIG. 4 is a schematic diagram of still another embodiment of the invention; and

FIG. 5 is a graph illustrating the variation in lever ratio and actuator position versus valve position for the linkage of FIG. 1.

DESCRIPTION OF THE PREFERRED EMBODIMENTS

With reference now to the drawings, and particularly to FIG. 1, the actuator shown includes a first linkage or valve stem 10 connected at its lower end to a steam valve 12 which, in the view shown, is seated on a valve seat 14. The valve stem 10 is provided with an enlarged portion 11 forming a backseat 15 for the valve 12 to form a seal when the valve is in the open position, as well known in the art. The valve 12 is actuated by means of a pneumatic or hydraulic actuator 16 having a piston member 18 which is urged to the left as viewed in FIG. 1 by means of a coil spring 20. In order to move the piston 18 to the right, air or oil under pressure is admitted into the actuator 16 through opening 22.

Connected to the piston 18 is a second linkage or piston rod 24, the first linkage 10 and second linkage 24 being pivotally connected at their respective ends to a third linkage 26 which lies in essentially the same plane as the first two linkages. The third linkage 26, in turn, is pivotally connected at its mid-point 28 to a fourth linkage 30 having its other end pivotally connected to a fixed point 32. As shown 2, FIG. 2 the point 32 is at the intersection of the sides of a right triangle whose hypotenuse comprises the linkage 26 and at the intersection of the axes of the first and second linkages.

As shown in FIG. 2, the lever 26 is twice as long as lever 30. Thus, two isosceles triangles are formed with lever 30 common to both. If point A, the pivotal connection of linkages 24 and 26, is moved rectilinearly or along a straight-line away from the pivot point 32, point B, the pivotal connection of linkages 10 and 26, moves rectilinearly or in a straight-line toward the pivot point 32. The lever ratio (i.e., the upward force $F_1$ on valve 12 divided by the sideways force $F_2$ exerted by actuator 16) is different for each position and is equal to the cotangent of the angle $\theta$.

The characteristics of the linkage are as shown in FIG. 5. As the valve moves away from the seat 14, the lever ratio decreases from a value approaching infinity along the curve 34. The practical limit to the ratio is approximately 4 to 1 (valve force four times the actuator force) at a minimum angle $\theta$ of about 14°. In the position where the valve is wide open, shown by the dotted outline in FIG. 2, the lever ratio approaches zero. The practical limit to the ratio is approximately 0.7 to 1 at an angle $\theta$ equal to 55°. As the lever ratio decreases, the actuator position increases along the curve 36 as shown in FIG. 5.

The diameter of the piston 18 and its stroke can be reduced compared to prior art designs since the high valve force and high lever ratio both occur when the valve is in its closed position as shown in FIG. 1 i.e., with the angle θ equal to about 14°). Reduced actuator volume allows for faster closing time with an equivalent spring load. Furthermore, the reduced actuator piston diameter plus the low lever ratio in the wide open position reduces design requirements and perhaps eliminates the need for Belleville washers or the like when the valve becomes backseated on the valve housing 38 as shown in dashed lines in FIG. 2, i.e., when the valve 12 is in the fully open position with its backseat 15 in abutment with the housing 38.

When closing, the valve 12 automatically reduces in velocity as it approaches the seat 14 due to the increasing lever ratio. This feature reduces the design requirements and perhaps eliminates the need for a dashpot in the actuator.

With reference now to FIG. 3, another embodiment of the invention is shown which is similar to that of FIG. 2. Accordingly, elements shown in FIG. 3 which correspond to those of FIG. 2 are identified by like reference numerals. In this case, however, the actuator 16 is on the opposite side of the pivot point A; and the actuator piston 18 pushes the point A, instead of pulling it as in FIG. 2, in order to unseat the valve 12 from its seat 14.

In FIG. 4, still another embodiment of the invention is shown wherein elements corresponding to those of FIG. 2 are again identified by like reference numerals. In this case, however, is the same. Note, however, that this design is not as desirable as that of FIGS. 2 and 3 since it necessarily increases the axial length of the actuator. the third linkage 26 pushes the linkage 10 upwardly instead of pulling it upwardly as the piston 18 moves from right to left, causing the levers to move from the full-line position shown to the dotted-line position shown. The principle of operation, however, is the same. Note, however, that this design is not as desirable as that of FIGS. 2 and 3 since it necessarily increases the axial length of the actuator.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A valve having a stem with a back seat disposed thereon, said stem being disposed in a back seated position forming a seal around said stem when said valve is in a fully open position, in combination with a fluid driven actuator and a mechanism having a plurality of links, said mechanism comprising said stem, which is the first link; said actuator, which is the second link and is disposed generally normal to said stem; a third link pivotally connected to said actuator and said stem; and a fourth link having one end pivotally connected to said third link and another end pivotally connected to a fixed point generally defined by the intersection of the sides of a right triangle of which said third link is the hypotenuse and the axis of said actuator and the axis of said stem are the other sides, which intersect to define the fixed point; whereby the actuator cooperates with the mechanism in such a manner that the forces apply to the stem as the stem approaches and departs from a position wherein the valve is closed, are substantially larger than the forces applied to the stem, when the stem approaches a position wherein the valve is fully opened and the stem is back seated.

2. A valve as set forth in claim 1, wherein the links of the mechanism are so disposed that when the valve is closed, the third link forms an angle of approximately 14° with the axis of the stem, and when the valve is fully open and the stem is in its back seated position, the third link forms an angle of approximately 55° with the axis of the stem, whereby the actuator cooperates with the mechanism to generally apply approximately four times as much force to the stem when the valve is closed than is applied to the stem when the valve is fully open and the stem is back seated.

3. A valve having a stem with a back seat disposed thereon, said stem being disposed in a back seated position forming a seal around the stem when the valve is in a fully open position, in combination with a fluid driven actuator and a mechanism having a plurality of links, said mechanism comprising said stem, which is the first link; said actuator, which is the second link and is disposed generally normal to the stem; a third link pivotally connected to the actuator and the stem; and a fourth link having one end pivotally connected to said third link and the other end pivotally connected to a fixed point generally defined by the intersection of the axis of the actuator and the axis of the stem, whereby the actuator cooperates with the mechanism in such a manner, that the forces applied to the stem as the stem approaches and departs from a position wherein the valve is closed, are significantly larger than the forces applied to the stem when the stem approaches a position, wherein the valve is fully open and the stem is back seated.

4. A valve as set forth in claim 3, wherein the links of the mechanism are so disposed that when the valve is closed the third link forms an angle of approximately 14° with the axis of the stem and when the valve is fully opened and the stem is back seated the third link forms an angle of approximately 55° with the axis of the stem, Whereby the actuator cooperates with the mechanism to apply generally four times as much force to the stem, when the valve is closed, that is applied to the stem, when the valve is fully opened and the stem is back seated.

* * * * *